United States Patent
Guo et al.

(10) Patent No.: US 11,153,135 B1
(45) Date of Patent: Oct. 19, 2021

(54) METHODS AND SYSTEMS FOR ADAPTIVE EQUALIZATION WITH WIDE RANGE OF SIGNAL AMPLITUDES

(71) Applicant: Texas Instruments Incorporated, Dallas, TX (US)

(72) Inventors: Shita Guo, Dallas, TX (US); Yanli Fan, Dallas, TX (US); Mustafa Ulvi Erdogan, Allen, TX (US); Douglas Edward Wente, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/146,454

(22) Filed: Jan. 11, 2021

(51) Int. Cl.
*H04L 25/03* (2006.01)

(52) U.S. Cl.
CPC ............... *H04L 25/03878* (2013.01)

(58) Field of Classification Search
CPC .............. H04L 25/03878; H04L 25/03885
See application file for complete search history.

(56) References Cited

U.S. PATENT DOCUMENTS

| | | | | |
|---|---|---|---|---|
| 4,583,235 A * | 4/1986 | Domer | ............... | H04L 25/12 375/229 |
| 5,764,695 A * | 6/1998 | Nagaraj | ............ | H04L 25/03885 375/232 |
| 6,188,721 B1 * | 2/2001 | Shirani | ............. | H04L 25/03885 375/232 |
| 6,381,270 B1 * | 4/2002 | Lydon | ............... | H04L 25/03885 333/28 R |
| 6,546,063 B1 * | 4/2003 | Lee | ................... | H04L 25/03885 375/232 |
| 6,567,489 B1 * | 5/2003 | Glover | ............ | G11B 20/10009 375/229 |
| 6,570,916 B1 * | 5/2003 | Feldbaumer | .......... | H04L 7/0331 375/232 |
| 6,965,470 B2 * | 11/2005 | So | ........................ | G02B 6/2931 359/341.41 |
| 6,975,678 B1 * | 12/2005 | Le | .......................... | H04B 3/143 375/232 |
| 7,277,513 B2 * | 10/2007 | Ahmed | ............... | H04L 27/2602 375/346 |
| 7,742,520 B2 * | 6/2010 | Simpson | ................ | H04L 7/033 375/229 |

(Continued)

*Primary Examiner* — James M Perez
(74) *Attorney, Agent, or Firm* — John R. Pessetto; Charles A. Brill; Frank D. Cimino (57) ABSTRACT

Methods and systems of adaptive equalization to compensate channel loss are disclosed. A method includes detecting a peak amplitude of an equalizer output signal and selecting a set of reference voltage levels from M sets based on the peak amplitude of the equalizer output signal, each of the M sets having N reference voltage levels. The method includes continuing to increase an equalization level in predetermined steps to a next higher equalization level if the applied equalization level does not correspond to the over-equalization level and evaluating the distribution of the resulting hit counts for each increase to the next higher equalization level until the applied equalization level corresponds to the over-equalization level. The method includes decreasing to the previously applied lower equalization level if the applied equalization level corresponds to the over-equalization level.

18 Claims, 5 Drawing Sheets

(56) References Cited

U.S. PATENT DOCUMENTS

| | | | |
|---|---|---|---|
| 7,847,648 B2* | 12/2010 | Hu | H03K 3/011 331/143 |
| 7,894,517 B2* | 2/2011 | Liu | H04L 25/03057 375/232 |
| 7,916,780 B2* | 3/2011 | Lee | H04L 25/03885 375/232 |
| 8,064,509 B1* | 11/2011 | Cops | H04L 25/03885 375/229 |
| 8,718,127 B2* | 5/2014 | Acosta-Serafini | H04L 25/03878 375/232 |
| 8,861,583 B2* | 10/2014 | Liu | H04L 25/03885 375/233 |
| 9,001,943 B2* | 4/2015 | Hoang | H03G 3/002 375/345 |
| 9,136,899 B2* | 9/2015 | Chakraborty | H04W 52/0261 |
| 9,379,682 B2* | 6/2016 | Hoang | H04B 3/143 |
| 9,397,824 B1* | 7/2016 | Hoshyar | H04L 7/0331 |
| 9,503,104 B2* | 11/2016 | Erdogan | H03L 7/0807 |
| 9,628,304 B2* | 4/2017 | Hoang | H04L 25/03019 |
| 9,749,162 B1* | 8/2017 | Mobin | H04L 25/03057 |
| 9,762,219 B1* | 9/2017 | Schemm | H03K 5/04 |
| 9,847,893 B2* | 12/2017 | Hoang | H03G 3/002 |
| 9,935,682 B1* | 4/2018 | Chada | H04L 25/4919 |
| 10,084,402 B2* | 9/2018 | Saw | H02P 8/22 |
| 10,551,859 B2* | 2/2020 | Gakhar | G05F 1/575 |
| 2004/0071203 A1* | 4/2004 | Gorecki | H04L 25/03038 375/229 |
| 2006/0181283 A1* | 8/2006 | Wajcer | H04B 3/46 324/539 |
| 2006/0182171 A1* | 8/2006 | Kuijk | H04B 3/141 375/229 |
| 2007/0064151 A1* | 3/2007 | Chang | H04B 10/85 348/470 |
| 2008/0112476 A1* | 5/2008 | Vong | H04L 25/4904 375/224 |
| 2008/0304557 A1* | 12/2008 | Hollis | H04L 25/03885 375/231 |
| 2009/0135895 A1* | 5/2009 | Liu | H04L 25/03057 375/231 |
| 2010/0090772 A1* | 4/2010 | Hu | H03K 3/011 331/143 |
| 2013/0034143 A1* | 2/2013 | Acosta-Serafini | H04L 25/03878 375/232 |
| 2014/0097881 A1* | 4/2014 | Lynch | H03F 3/45475 327/312 |
| 2014/0169439 A1* | 6/2014 | Liu | H04L 25/03038 375/233 |
| 2015/0365094 A1* | 12/2015 | Erdogan | H04L 7/04 375/371 |
| 2018/0076985 A1* | 3/2018 | Schell | H04L 25/0262 |

\* cited by examiner

METHODS AND SYSTEMS FOR ADAPTIVE EQUALIZATION WITH WIDE RANGE OF SIGNAL AMPLITUDES

BACKGROUND

The disclosure generally relates to adaptive equalization to compensate channel loss.

DESCRIPTION OF THE RELATED ART

Equalizers are critical to the operations of telecommunications and electronic systems. In telecommunications, equalization is used to compensate loss incurred by a signal transmitted through a channel. Equalization reverses distortions incurred by the signal transmitted through the channel. When the channel is equalized, the frequency attributes of the signal are reproduced at the output.

Since the channel loss incurred by a signal can vary depending on the channel (e.g., HDMI, USB), an equalizer is typically adapted to reproduce the frequency attributes of the signal. Without equalizer adaptation, the equalizer output may either be under-equalized or over-equalized. Existing adaptive equalization systems equalize signals with only a limited range of amplitudes. If the amplitude is too low, the existing adaptive systems may over-equalize, and if the amplitude is too high, the existing adaptive systems may under-equalize, thus failing to reverse distortions incurred by the signal.

SUMMARY

In one aspect, a method includes detecting the peak amplitude of an equalizer output signal and selecting a set of reference voltage levels from M sets based on the peak amplitude, each of the M sets having N reference voltage levels. The method includes initially applying zero equalization to generate the equalizer output signal and comparing the equalizer output signal to the N reference voltage levels of the selected set. The method includes generating hit counts responsive to the comparison of the equalizer output signal to the N reference voltage levels. The method includes increasing from zero equalization to a first equalization level and applying the first equalization level to generate hit counts responsive to the comparison of the equalizer output signal to the N reference voltage levels, and evaluating the distribution of resulting hit counts to determine if the applied equalization level corresponds to an over-equalization level. The method includes decreasing to the previously applied lower equalization level if the applied equalization level corresponds to the over-equalization level, wherein the previously applied lower equalization level corresponds to an optimal equalization level. The method includes continuing to increase the equalization level in predetermined steps to a next higher equalization level if the applied equalization level does not correspond to the over-equalization level and evaluating the distribution of the resulting hit counts for each increase to the next higher equalization level until the applied equalization level corresponds to the over-equalization level, and decreasing to the previously applied lower equalization level if the applied equalization level corresponds to the over-equalization level.

In an additional aspect of the disclosure, the method for detecting the peak amplitude of the equalizer output signal includes selecting a subset of the M sets comprising the highest reference voltage level from each of the M sets and applying zero equalization and comparing the equalizer output signal to the reference voltage level having the highest value in the selected subset. The method includes determining the peak amplitude of the equalizer output signal based on the reference voltage level having the highest value in the subset and the reference voltage level having the second highest value in the selected subset if there are any hit counts responsive to the comparison of the equalizer output signal and the reference voltage level having the highest value in the subset. The method includes comparing the equalizer output signal to the reference voltage level having the second highest value in the subset if there are no hit counts responsive to the comparison of the equalizer output signal and the reference voltage level having the highest value in the subset. The method includes determining the peak amplitude of the equalizer output signal based on the reference voltage level having the second highest value in the subset and the reference voltage level having the third highest value in the subset if there are any hit counts responsive to the comparison of the equalizer output signal and the reference voltage level having the second highest value in the subset. The method includes continuing to compare the equalizer output signal to the reference voltage level having the next highest value in the subset until there is at least one hit count and determining the peak amplitude based on the compared reference voltage level and the reference voltage level having the next highest value if there are no hit counts responsive to the comparison of the equalizer output signal and the reference voltage level having the second highest value in the subset.

In an additional aspect of the disclosure, an adaptive equalization system includes an equalizer having a first input configured to receive an input signal and a second input configured to receive a boost control signal and an output configured to provide an equalizer output signal. The system includes a comparison circuit having a first input configured to receive the equalizer output signal and a second input configured to receive a reference voltage and an output configured to provide a comparison signal. The system includes an equalizer control circuit having an input configured to receive the comparison signal and a first output configured to provide the boost control signal and a second output configured to provide a reference voltage level control signal. The system includes a digital-to-analog (DAC) converter having a first input configured to receive the reference voltage level control signal and an output configured to provide the reference voltage, wherein the equalizer control circuit is configured to determine the peak amplitude of the equalizer output signal and in response provide the reference voltage level control signal.

In an additional aspect, the adaptive equalization system includes a divider circuit having an input configured to receive the comparison signal and an output configured to provide a division signal, and includes a counter having an input configured to receive the division signal and an output configured to provide hit counts responsive to the division signal.

In an additional aspect, a non-transitory computer-readable medium having program code recorded thereon includes: program code to detect a peak amplitude of an equalizer output signal; program code to select a set of reference voltage levels from M sets based on the peak amplitude of the equalizer output signal, each of the M sets having N reference voltage levels; program code to initially apply zero equalization to generate the equalizer output signal and to compare the equalizer output signal to the N reference voltage levels of the selected set; program code to generate hit counts responsive to the comparison of the equalizer output signal to the N reference voltage levels; program code to increase from zero equalization to a first equalization level and to apply the first equalization level to generate hit counts responsive to the comparison of the equalizer output signal to the N reference voltage levels, and to evaluate the distribution of resulting hit counts to determine if the applied equalization level corresponds to an over-equalization level; program code to decrease to the previously applied lower equalization level if the applied equalization level corresponds to the over-equalization level, wherein the previously applied lower equalization level corresponds to an optimal equalization level; program code to continue to increase the equalization level in predetermined steps to a next higher equalization level if the applied equalization level does not correspond to the over-equalization level and to evaluate the distribution of the resulting hit counts for each increase to the next higher equalization level until the applied equalization level corresponds to the over-equalization level, and to decrease to the previously applied lower equalization level if the applied equalization level corresponds to the over-equalization level.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein. Rather, these descriptions are provided so that this disclosure will satisfy applicable requirements.

Figure 1A:
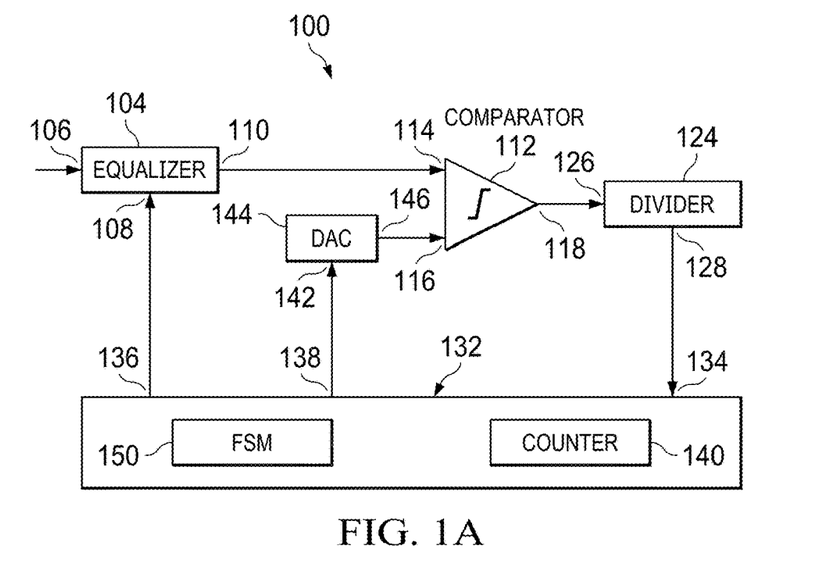
FIGS. 1A-1B are block diagrams of systems of example embodiments.

FIG. 1A is a block diagram of an adaptive equalization system 100 of an example embodiment. The system 100 detects the peak amplitude of a signal and selects an optimal equalization level in order to compensate for loss incurred by the signal transmitted through a channel. Furthermore, the system 100 compensates for channel loss of signals having a wide range of amplitudes.

The adaptive equalization system 100 includes an equalizer 104 having a first input 106 configured to receive an input signal and a second input 108 configured to receive a boost control signal and an output 110 configured to provide an equalizer output signal. The system 100 includes a comparison circuit 112 having a first input 114 configured to receive the equalizer output signal and a second input 116 configured to receive a reference voltage and an output 118 configured to provide a comparison signal. In an example embodiment, the comparison circuit 112 is an analog comparator configured to compare the equalizer output signal to the reference voltage and in response provide the comparison signal.

With continuing reference to FIG. 1A, transitions at the output of the comparison circuit 112, referred to as hit counts, may be very fast if the input signal has a high frequency. Accordingly, a divider 124 may optionally be used to divide and lower the hit counts. For example, the divider 124 can be configured to divide by an integer (e.g., 4, 8, 16 or 32) to lower the hit counts. The divider 124 has an input 126 configured to receive the comparison signal. The divider 124 provides lowered hit counts at its output 128. The system 100 includes an equalizer control circuit 132 having a input 134 configured to receive the comparison signal and a first output 136 configured to provide the boost control signal and a second output 138 configured to provide a reference voltage level control signal.

In an example embodiment, the equalizer control circuit 132 includes a counter 140 which counts the hits. The equalizer control circuit 132 evaluates the distribution of the hit counts and in response provides the boost control signal at the first output 136. In an example embodiment, the divider 124 may be implemented inside the equalizer control circuit 132, and in that case the equalizer control circuit 132 may receive the hit counts from the comparison circuit 112 and divide by the divider 124 to lower the hit counts. In an example embodiment, the equalizer control circuit 132 also determines the peak amplitude of the equalizer output signal and provides a reference voltage level control signal at the second output 138. The reference voltage level control signal may indicate the peak amplitude and a plurality of sets (e.g., M sets) of reference voltage levels. The system 100 includes a digital-to-analog converter (DAC) 144 having an input 142 configured to receive the reference voltage level control signal and an output 146 configured to provide the reference voltage. In an example embodiment, the equalizer control circuit 132 includes a finite state machine (FSM) 150 configured to evaluate or assess the distribution of the hit counts and provide the boost control signal and the reference voltage level control signal. The FSM 150 is described below in more detail.

Figure 1B:
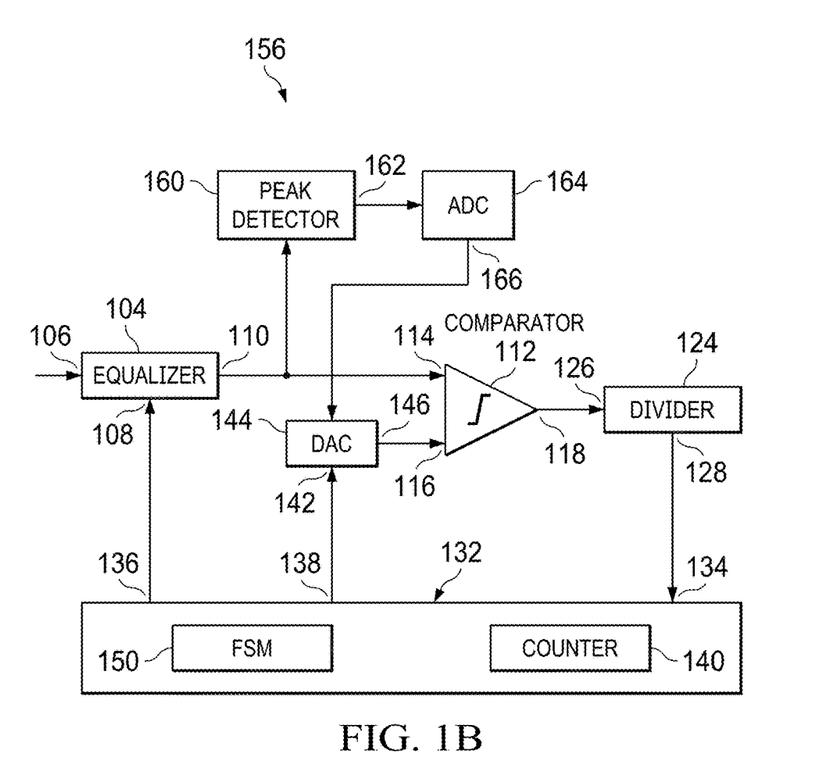

In another example embodiment, a system 156 illustrated in FIG. 1B optionally may include an analog peak detector 160 configured to detect the peak amplitude of the equalizer output signal and to provide an analog peak detection signal at an output 162. The peak detector 160 monitors the voltage of the equalizer output signal and retains its peak value at the output 162. An analog-to-digital converter (ADC) 164 converts the analog peak detection signal and provides a digital peak detection signal at an output 166. The DAC 144 receives the digital peak detection signal and receives the reference voltage level control signal from the equalizer control circuit 132, and in response the DAC 144 provides the reference voltage.

Figure 2:
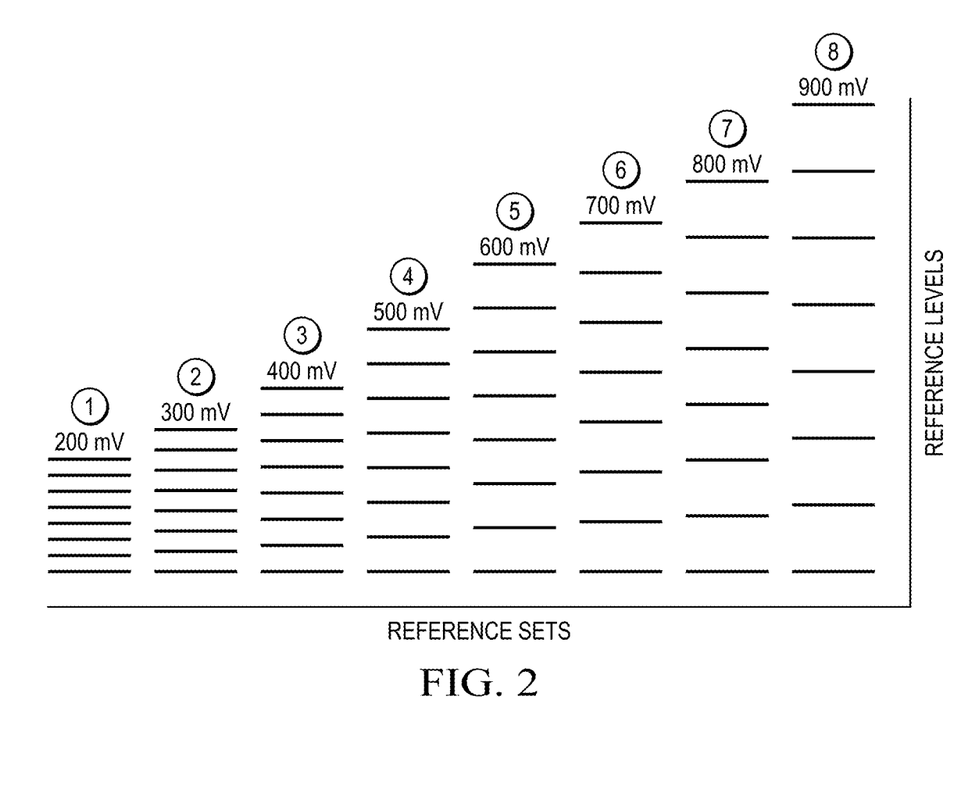
FIGS. 2-3 illustrate sets of reference voltage levels.

FIG. 2 shows M sets (e.g., M=8) of reference voltage levels, wherein M is an integer. Each set has N (e.g., N=8) reference voltage levels, where N is an integer, with one of the reference voltage levels in each set having the lowest or minimum value and another having the highest or maximum value. Also, in each set, the reference voltage levels rise from the minimum value to the maximum value in a predetermined increment. Furthermore, the highest or maximum values in the M sets also rise in a predetermined increment. Thus, the sets of reference voltage levels have different highest reference voltage levels.

By way of example, in set #1, reference voltage levels rise from a minimum value of 140 mV to a maximum value of 200 mV, and in set #2, the reference voltage levels rise from a minimum value of 140 mV to a maximum value of 300 mV, and in set #3, the reference voltage levels rise from a minimum value of 140 mV to a maximum value of 400 mV. The highest or maximum values in the 8 sets also rise from 200 mV to 900 mV, in an increment of 100 mV.

In an example embodiment, M sets of reference voltage levels are generated by the equalizer control circuit 132, and one set is selected whose maximum value is slightly higher than the peak amplitude of the equalizer output signal. If, for example, the peak amplitude of the equalizer output signal is 380 mV, set #3 is selected because its maximum value is 400 mV, which is slightly higher than the peak amplitude. Since the system 100 generates M sets of reference voltage levels wherein the highest or maximum values in the M sets rise from a minimum value to a maximum value in a predetermined increment, the system 100 can equalize and reproduce signals with a wide range of peak amplitude. The system 100 detects the peak amplitude of the equalizer output signal and selects one of the sets whose maximum value is slightly higher than the peak amplitude.

Figure 3:
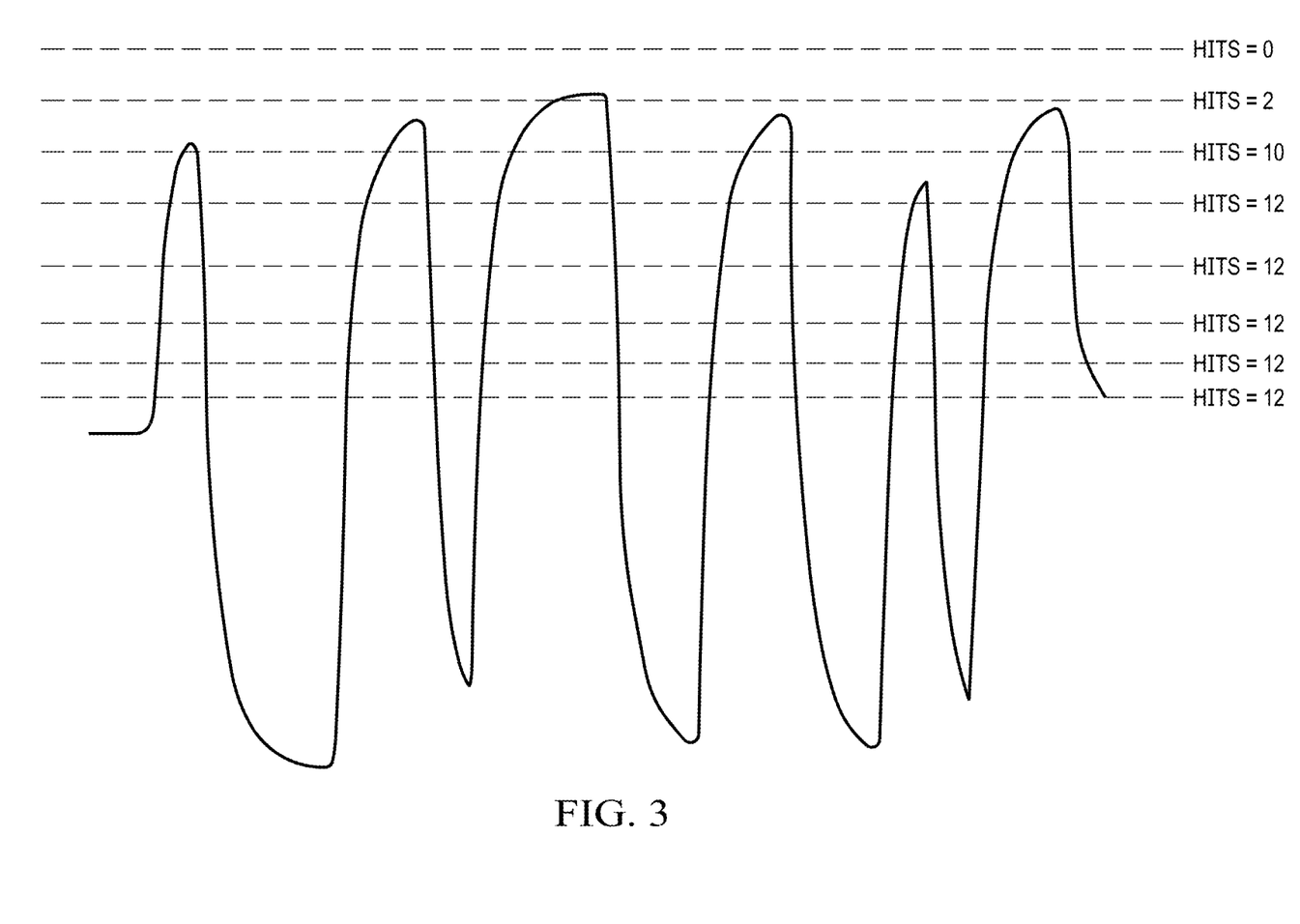

FIG. 3 shows a set of reference voltage levels selected from M sets. The highest voltage level in the selected set is slightly above the peak amplitude of the equalizer output signal. With the equalizer gain (i.e., equalization level) initially set at zero, the equalizer output signal is compared to the reference voltage levels in the selected set. Based on the comparison of the equalizer output signal to the reference voltage levels, hit counts are generated. As shown in FIG. 3, a hit count is generated in each instance the signal intersects (i.e., crosses) the reference voltage levels. Next, the equalizer gain is increased to a next higher level (e.g., first equalization level) and the equalizer output signal is compared to the reference voltage levels. Based on the comparison, hit counts are generated, and the distribution of the hit counts are again evaluated or assessed by the equalizer control circuit 132 to determine if the applied equalization level corresponds to an over-equalization level. If the distribution of the hit counts indicate that the applied equalization level corresponds to the over-equalization level, the equalizer gain is reduced to the previously applied lower equalization level, and the reduced equalizer gain is determined to be an optimal equalization level.

If the applied equalization level does not correspond to the over-equalization level, the equalizer gain is increased to a next higher equalization level (e.g., second equalization level) and the distribution of the resulting hit counts are again evaluated. The process is repeated for each increase in predetermined steps to a next higher equalization level and the distribution of the resulting hit counts are evaluated for each increase until the applied equalization level corresponds to the over-equalization level, and then the equalization level is decreased to the previously applied lower equalization level which is determined to be the optimal equalization level.

In an example embodiment, the distribution of the hit counts indicates an over equalization level if the distribution indicates overshoots and undershoots caused by ringing.

In an example embodiment, the equalizer control circuit 132 determines the peak amplitude of the equalizer output signal by selecting the highest reference voltage level from each of the M sets. Thus, a subset comprising the highest reference voltage level from each of the M sets is formed. With zero equalization applied, the equalizer output signal is compared to the reference voltage level having the highest value in the selected subset. If there are any hit counts responsive to the comparison of the equalizer output signal and the reference voltage level having the highest value in the subset, the peak amplitude is determined based on the reference voltage level having the highest value in the subset and the reference voltage level having the second highest value in the selected subset. In an example embodiment, the peak amplitude is determined to be at approximately mid point between the highest value and the second highest value in the subset.

If there are no hit counts responsive to the comparison of the equalizer output signal and the reference voltage level having the highest value in the subset, the equalizer output signal is compared to the reference voltage level having the second highest value in the subset. If there are any hit counts responsive to the comparison of the equalizer output signal and the reference voltage level having the second highest value in the subset, the peak amplitude is determined based on the second highest value and the third highest value in the subset. In an example embodiment, the peak amplitude is determined to be at approximately mid point between the second highest value and the third highest value.

If there are no hit counts responsive to the comparison of the equalizer output signal and the reference voltage level having the second highest value in the subset, the process is continued by comparing the equalizer output signal to the reference voltage level having the next highest value in the subset until there is at least one hit count and the peak amplitude is determined based on the compared reference voltage level and the reference voltage level having the next highest value.

Figure 4A:
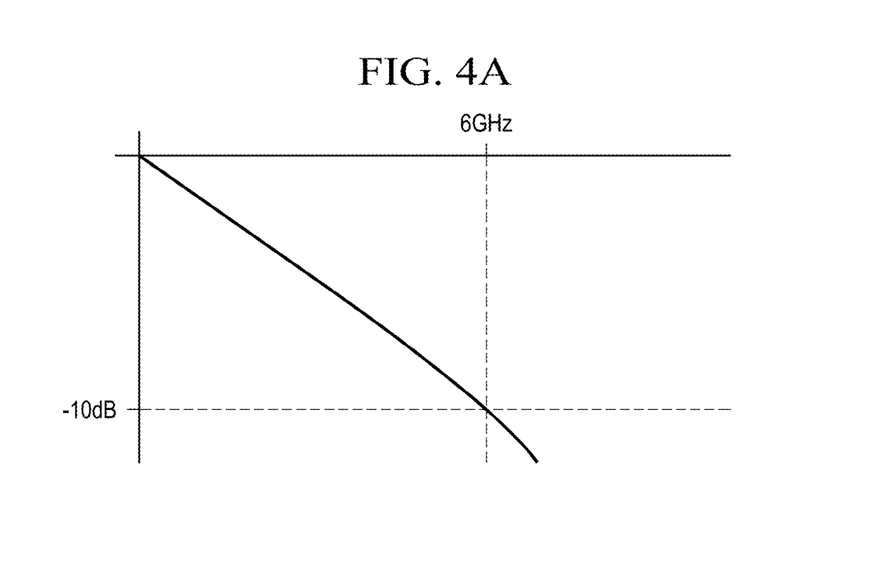
FIGS. 4A-4B illustrate channel loss and equalization.
Figure 4B:
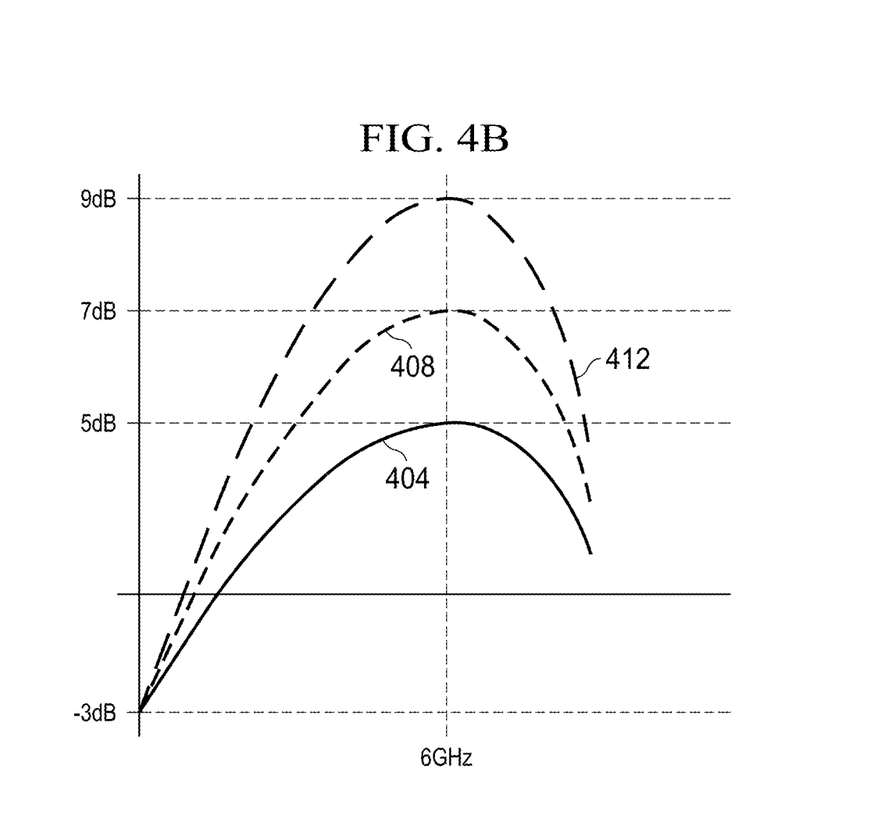

In an example embodiment, the finite state machine (FSM) 150 is configured to evaluate or assess the distribution of the hit counts and in response provide the boost control signal to the equalizer 104. The FSM 150 includes an algorithm which traces a plurality of equalizer response graphs and sweeps the reference voltage levels against the response graphs to generate hit counts. The FSM 150 evaluates the distribution of the resulting hit counts to identify the response graph that corresponds to an optimal equalized curve. The operation of the FSM 150 is illustrated in FIGS. 4A and 4B. FIG. 4A shows channel loss characteristics of a cable through which a signal is transmitted. The signal transmitted through the cable exhibits 0 dB loss at DC (0 Hz) and −10 dB loss at 6 GHz. Thus, the signal transmitted through the cable exhibits a linear channel loss as the frequency rises from 0 Hz to 6 GHz. The signal is thereafter equalized by an equalizer to reverse the distortion incurred during transmission through the cable. FIG. 4B shows 3 example response graphs of the equalizer: an under-equalized response graph 404, an optimal equalized response graph 408, and an over-equalized response graph 412. The FSM 150 traces the response graphs and sweeps the reference voltage levels against the response graphs to generate hit counts. The FSM 150 evaluates the distribution of the resulting hit counts and identifies the response graph 408 as the optimal equalized curve. The channel loss characteristic of the cable shown in FIG. 4A is nearly inverse of the optimal equalized graph 408. Thus, by selecting the optimal equalized graph 408, the equalizer is able to compensate for the channel loss, i.e., reverse the distortion incurred by the signal during transmission.

In an example embodiment, the FSM 150 also determines the peak amplitude of the equalizer output signal and in response provides the reference voltage level control signal. The reference voltage level control signal indicates sets of reference voltage levels (e.g., M sets) and the detected peak amplitude. The DAC 144 receives the reference voltage level control signal and in response provides the reference voltage to the comparison circuit 112.

Variations to the system 100 within the scope of the disclosure are possible. The ADC 164 may provide the digital peak detection signal to the DAC 144, and the FSM 150 may provide the reference voltage level control signal indicating sets of reference voltage levels to the DAC 144. In response, the DAC 144 provides the reference voltage.

Other variations to the system 100 within the scope of the disclosure are possible. The FSM 150 may be replaced with an FPGA, an ASIC, a microprocessor, a finite state machine (FSM) or software configured to perform the aforementioned operations.

Figure 5:
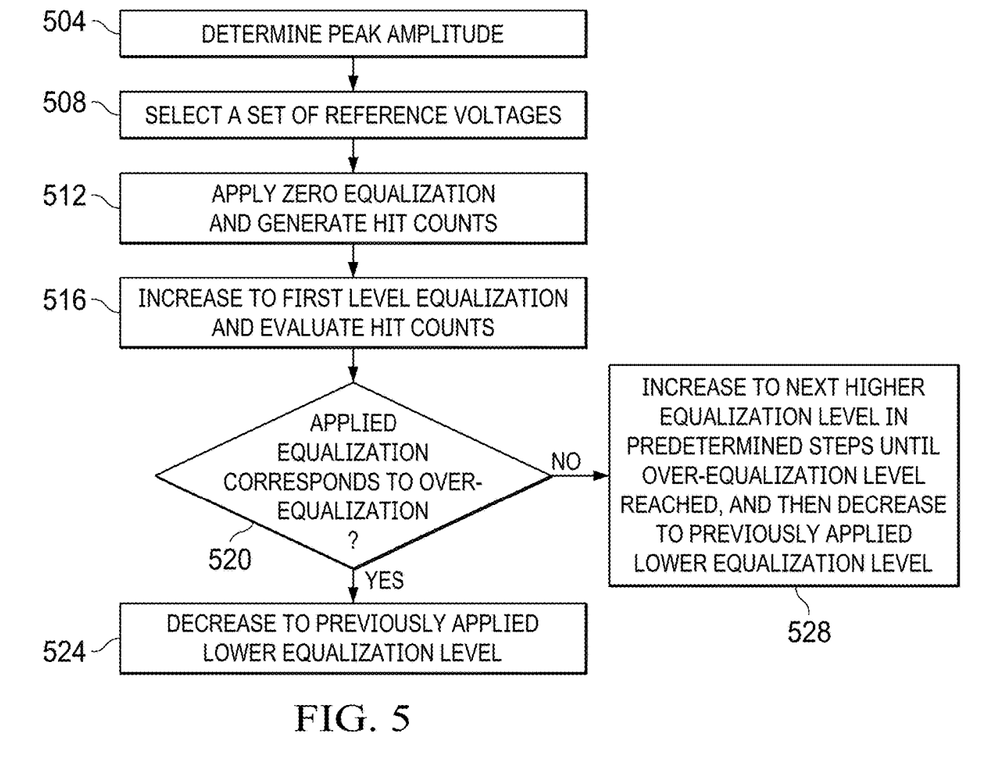
FIG. 5 is a flow diagram of an example embodiment.

FIG. 5 is a flow diagram of an example embodiment. In a block 504, the peak amplitude of the equalizer output signal is determined. In a block 508, a set of reference voltage levels is selected from M sets based on the peak amplitude of the equalizer output signal, each of the M sets having N reference voltage levels. In a block 512, zero equalization is applied to generate the equalizer output signal and the equalizer output signal is compared to the N reference voltage levels of the selected set and hit counts are generated responsive to the comparison of the equalizer output signal to the N reference voltage levels.

In a block 516, the equalization level is increased from zero equalization to a first equalization level and the first equalization level is applied to generate hit counts responsive to the comparison of the equalizer output signal to the N reference voltage levels, and the distribution of resulting hit counts are evaluated to determine if the applied equalization level corresponds to an over-equalization level. In a decision block 520, a decision is made if the applied equalization level corresponds to the over-equalization level. If the applied equalization block corresponds to the over-equalization level, the flow moves to a block 524 where the equalization level is decreased to the previously applied lower equalization level, wherein the previously applied lower equalization level corresponds to an optimal equalization level.

If the applied equalization level does not correspond to the over-equalization level, the flow moves to a block 528 where the equalization level is increased to a next higher equalization level in predetermined steps and the distribution of the resulting hit counts are evaluated for each increase to the next higher equalization level until the applied equalization level corresponds to the over-equalization level, and the equalization level is decreased to the previously applied lower equalization level if the applied equalization level corresponds to the over-equalization level. The previously applied lower equalization level is determined as the optimal-equalization level.

In one aspect, a non-transitory computer-readable medium having program code recorded thereon includes program code to detect a peak amplitude of an equalizer output signal; program code to select a set of reference voltage levels from M sets based on the peak amplitude of the equalizer output signal, each of the M sets having N reference voltage levels; program code to initially apply zero equalization to generate the equalizer output signal and to compare the equalizer output signal to the N reference voltage levels of the selected set; program code to generate hit counts responsive to the comparison of the equalizer output signal to the N reference voltage levels; program code to increase from zero equalization to a first equalization level and to apply the first equalization level to generate hit counts responsive to the comparison of the equalizer output signal to the N reference voltage levels, and to evaluate the distribution of resulting hit counts to determine if the applied equalization level corresponds to an over-equalization level; program code to decrease to the previously applied lower equalization level if the applied equalization level corresponds to the over-equalization level, wherein the previously applied lower equalization level corresponds to an optimal equalization level; program code to continue to increase the equalization level in predetermined steps to a next higher equalization level if the applied equalization level does not correspond to the over-equalization level and to evaluate the distribution of the resulting hit counts for each increase to the next higher equalization level until the applied equalization level corresponds to the over-equalization level, and to decrease to the previously applied lower equalization level if the applied equalization level corresponds to the over-equalization level.

Various illustrative components, blocks, modules, circuits, and steps have been described above in general terms of their functionality. Whether such functionality is implemented as hardware or software depends upon the particular application and design constraints imposed on the overall system. The described functionality may be implemented in varying ways for each particular application, but such implementation decision should not be interpreted as causing a departure from the scope of the present disclosure.

For simplicity and clarity, the full structure and operation of all systems suitable for use with the present disclosure is not being depicted or described herein. Instead, only so much of a system as is unique to the present disclosure or necessary for an understanding of the present disclosure is depicted and described.

What is claimed is:

1. A method of adaptive equalization, comprising:
   detecting a peak amplitude of an equalizer output signal;
   selecting a set of reference voltage levels from M sets based on the peak amplitude of the equalizer output signal, each of the M sets having N reference voltage levels;
   initially applying zero equalization to generate the equalizer output signal and comparing the equalizer output signal to the N reference voltage levels of the selected set;
   generating hit counts responsive to the comparison of the equalizer output signal to the N reference voltage levels;
   increasing from zero equalization to a first equalization level and applying the first equalization level to generate hit counts responsive to the comparison of the equalizer output signal to the N reference voltage levels, and evaluating the distribution of resulting hit counts to determine if the applied equalization level corresponds to an over-equalization level;
   if the applied equalization level corresponds to the over-equalization level, decreasing to the previously applied lower equalization level, wherein the previously applied lower equalization level corresponds to an optimal equalization level;
   if the applied equalization level does not correspond to the over-equalization level, continuing to increase the equalization level in predetermined steps to a next higher equalization level and evaluating the distribution of the resulting hit counts for each increase to the next higher equalization level until the applied equalization level corresponds to the over-equalization level, and decreasing to the previously applied lower equalization level if the applied equalization level corresponds to the over-equalization level.

2. The method of claim 1, wherein the reference voltage level having the highest value in the selected set is greater than the peak amplitude of the equalizer output signal.

3. The method of claim 1, wherein detecting the peak amplitude of the equalizer output signal comprises:
   selecting a subset of the M sets comprising the highest reference voltage level from each of the M sets;

applying zero equalization and comparing the equalizer output signal to the reference voltage level having the highest value in the selected subset;

if there are any hit counts responsive to the comparison of the equalizer output signal and the reference voltage level having the highest value in the subset, determining the peak amplitude of the equalizer output signal based on the reference voltage level having the highest value in the subset and the reference voltage level having the second highest value in the selected subset;

if there are no hit counts responsive to the comparison of the equalizer output signal and the reference voltage level having the highest value in the subset, comparing the equalizer output signal to the reference voltage level having the second highest value in the subset;

if there are any hit counts responsive to the comparison of the equalizer output signal and the reference voltage level having the second highest value in the subset, determining the peak amplitude of the equalizer output signal based on the reference voltage level having the second highest value in the subset and the reference voltage level having the third highest value in the subset; and if there are no hit counts responsive to the comparison of the equalizer output signal and the reference voltage level having the second highest value in the subset, continuing to compare the equalizer output signal to the reference voltage level having the next highest value in the subset until there is at least one hit count and determining the peak amplitude based on the compared reference voltage level and the reference voltage level having the next highest value.

4. The method of claim 3, wherein the peak amplitude of the equalizer output signal is between the compared reference voltage level and the reference voltage level having the next highest value if there is a hit count.

5. The method of claim 1, wherein the hit counts are generated responsive to intersections of the equalizer output signal and the compared reference voltage levels.

6. The method of claim 1, wherein the applied equalization level corresponds to the over-equalization level if the distribution of the hit counts indicates overshoots and undershoots.

7. The method of claim 1, wherein M and N are integers.

8. An adaptive equalization system, comprising:

an equalizer having a first input configured to receive an input signal and a second input configured to receive a boost control signal and an output configured to provide an equalizer output signal;

a comparison circuit having a first input configured to receive the equalizer output signal and a second input configured to receive a reference voltage and an output configured to provide a comparison signal;

an equalizer control circuit having an input configured to receive the comparison signal and a first output configured to provide the boost control signal and a second output configured to provide a reference voltage level control signal; and a digital-to-analog converter having a first input configured to receive the reference voltage level control signal and an output configured to provide the reference voltage, wherein the equalizer control circuit is configured to detect the peak amplitude of the equalizer output signal and in response provide the reference voltage level control signal;

further comprising:

a divider circuit having an input configured to receive the comparison signal and an output configured to provide a division signal; and a counter having an input configured to receive the division signal and an output configured to provide hit counts responsive to the division signal.

9. An adaptive equalization system, comprising:

an equalizer having a first input configured to receive an input signal and a second input configured to receive a boost control signal and an output configured to provide an equalizer output signal;

a comparison circuit having a first input configured to receive the equalizer output signal and a second input configured to receive a reference voltage and an output configured to provide a comparison signal;

an equalizer control circuit having an input configured to receive the comparison signal and a first output configured to provide the boost control signal and a second output configured to provide a reference voltage level control signal; and a digital-to-analog converter having a first input configured to receive the reference voltage level control signal and an output configured to provide the reference voltage, wherein the equalizer control circuit is configured to detect the peak amplitude of the equalizer output signal and in response provide the reference voltage level control signal;

wherein the equalizer control circuit comprises a finite state machine configured to evaluate the distribution of hit counts and to provide the boost control signal responsive to the distribution of the hit counts.

10. An adaptive equalization system, comprising:

an equalizer having a first input configured to receive an input signal and a second input configured to receive a boost control signal and an output configured to provide an equalizer output signal;

a peak detector circuit having an input configured to receive the equalizer output signal and an output configured to provide an analog peak detection signal indicating the peak amplitude of the equalizer output signal;

an analog-to-digital converter having an input configured to receive the analog peak detection signal and an output configured to provide a digital peak detection signal;

a digital-to-analog converter having a first input configured to receive a reference voltage level control signal and a second input configured to receive the digital peak detection signal and an output configured to provide a reference voltage;

a comparison circuit having a first input configured to receive the equalizer output signal and a second input configured to receive the reference voltage and an output configured to provide a comparison signal; and an equalizer control circuit having an input configured to receive the comparison signal and a first output configured to provide the boost control signal and a second output configured to provide the reference voltage level control signal.

11. The adaptive equalization system of claim 10, further comprising:

a divider circuit having an input configured to receive the comparison signal and an output configured to provide a division signal; and a counter having an input configured to receive the division signal and an output configured to provide hit counts responsive to the division signal.

12. The adaptive equalization system of claim 10, wherein the equalizer control circuit comprises a finite state machine configured to evaluate the distribution of the hit counts and to provide the boost control signal responsive to the distribution of the hit counts.

13. The adaptive equalization system of claim 10, wherein the equalizer control circuit comprises a finite state machine configured to provide the reference voltage level control signal.

14. A method of adaptive equalization comprising:
   detecting a peak amplitude of an equalizer output signal;
   selecting a set of reference voltage levels from M sets based on the peak amplitude of the equalizer output signal, each of the M sets having N reference voltage levels, wherein the reference voltage level having the highest value in the selected set is greater than the peak amplitude of the equalizer output signal;
   initially applying zero equalization to generate the equalizer output signal and comparing the equalizer output signal to the N reference voltage levels of the selected set;
   generating hit counts responsive to the comparison of the equalizer output signal to the N reference voltage levels;
   increasing from zero equalization to a first equalization level and applying the first equalization level to generate hit counts responsive to the comparison of the equalizer output signal to the N reference voltage levels, and evaluating the distribution of resulting hit counts to determine if the applied equalization level corresponds to an over-equalization level;
   if the applied equalization level corresponds to the over-equalization level, decreasing to the previously applied lower equalization level, wherein the previously applied lower equalization level corresponds to an optimal equalization level;
   if the applied equalization level does not correspond to the over-equalization level, continuing to increase the equalization level in predetermined steps to a next higher equalization level and evaluating the distribution of the resulting hit counts for each increase to the next higher equalization level until the applied equalization level corresponds to the over-equalization level, and decreasing to the previously applied lower equalization level if the applied equalization level corresponds to the over-equalization level,
   wherein the hit counts are generated responsive to intersections of the equalizer output signal and the compared reference voltage levels, and
   wherein the applied equalization level corresponds to the over-equalization level if the distribution of the hit counts indicates overshoots and undershoots.

15. The method of claim 14, wherein detecting the peak amplitude of the equalizer output signal comprises:
   selecting a subset of the M sets comprising the highest reference voltage level from each of the M sets;
   applying zero equalization and comparing the equalizer output signal to the reference voltage level having the highest value in the selected subset;
   if there are any hit counts responsive to the comparison of the equalizer output signal and the reference voltage level having the highest value in the subset, determining the peak amplitude of the equalizer output signal based on the reference voltage level having the highest value in the subset and the reference voltage level having the second highest value in the selected subset;
   if there are no hit counts responsive to the comparison of the equalizer output signal and the reference voltage level having the highest value in the subset, comparing the equalizer output signal to the reference voltage level having the second highest value in the subset;
   if there are any hit counts responsive to the comparison of the equalizer output signal and the reference voltage level having the second highest value in the subset, determining the peak amplitude of the equalizer output signal based on the reference voltage level having the second highest value in the subset and the reference voltage level having the third highest value in the subset; and
   if there are no hit counts responsive to the comparison of the equalizer output signal and the reference voltage level having the second highest value in the subset, continuing to compare the equalizer output signal to the reference voltage level having the next highest value in the subset until there is at least one hit count and determining the peak amplitude based on the compared reference voltage level and the reference voltage level having the next highest value.

16. The method of claim 14, wherein the peak amplitude of the equalizer output signal is between the compared reference voltage level and the reference voltage level having the next highest value if there is a hit count.

17. The method of claim 14, wherein the hit counts are generated responsive to intersections of the equalizer output signal and the compared reference voltage levels.

18. The method of claim 14, wherein M and N are integers.

* * * * *